(12) United States Patent
Zhou

(10) Patent No.: US 9,651,809 B2
(45) Date of Patent: May 16, 2017

(54) DISPLAY MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Peng Zhou, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 82 days.

(21) Appl. No.: 14/744,368

(22) Filed: Jun. 19, 2015

(65) Prior Publication Data
US 2016/0266433 A1 Sep. 15, 2016

(30) Foreign Application Priority Data

Mar. 11, 2015 (CN) .................. 2015 2 0136809 U

(51) Int. Cl.
*G02F 1/1333* (2006.01)
*G02F 1/1335* (2006.01)

(52) U.S. Cl.
CPC .. *G02F 1/133308* (2013.01); *G02F 1/133512* (2013.01); *G02F 2001/13332* (2013.01); *G02F 2001/133317* (2013.01); *G02F 2001/133328* (2013.01)

(58) Field of Classification Search
CPC ......... G02F 1/133308; G02F 1/133512; G02F 2001/133317
USPC .......................................................... 349/58
See application file for complete search history.

(56) References Cited

U.S. PATENT DOCUMENTS 5,659,376 A * 8/1997 Uehara ............. G02F 1/133308
348/794

* cited by examiner

*Primary Examiner* — Lucy Chien
(74) *Attorney, Agent, or Firm* — Nath, Goldberg & Meyer; Joshua B. Goldberg

(57) ABSTRACT

The present invention provides a display module and a display device. The display module includes a display panel, a backlight arranged to be opposite to the display panel and a frame used for connecting the display panel with the backlight, wherein the frame includes a plurality of frame side walls arranged on surroundings of the display panel and the backlight in a surrounding manner, supporting structures used for supporting the display panel are respectively arranged on at least two oppositely arranged frame side walls, the backlight is arranged below the supporting structures, and the frame further includes a fixing structure used for fixing the display panel on the supporting structures. No rubber frame is needed in the display module provided by the present invention, thereby saving the cost and increasing the display area, and meanwhile, the display panel can be stably fixed.

13 Claims, 3 Drawing Sheets

DISPLAY MODULE AND DISPLAY DEVICE

CROSS REFERENCE OF RELATED APPLICATION

The present application claims the priority of Utility Model Patent Application No. 201520136809.7, filed in the State Intellectual Property Office of the P. R. China on Mar. 11, 2015, and entitled "显示模组和显示装置" ("DISPLAY MODULE AND DISPLAY DEVICE"), the entire contents of which are herein incorporated by reference.

FIELD OF THE INVENTION

The present invention relates to the field of display technology, and in particular relates to a display module and a display device.

BACKGROUND OF THE INVENTION

After recent decades of development, liquid crystal display devices have been widely used due to the advantages of high image quality, low power, low cost, etc.

FIG. 1 shows a schematic diagram of a local structure of a display device in the prior art. The display device includes a display panel 10 and a backlight 20, wherein the backlight 20 includes members such as a rubber frame 23, a backplane 21, an optical film 22 and a light emitting component 24. In order to ensure the structure stability of the display device, the structure of the existing display device is relatively complicated, resulting in a higher overall cost.

Therefore, how to reduce the cost of the display device without influencing the structure stability of the display device becomes a technical problem to be urgently solved in the field.

SUMMARY OF THE INVENTION

A purpose of the present invention is to provide a display module and a display device, for reducing the cost of the display device and maintaining the structure stability of the display device at the same time.

To fulfill the above purpose, the present invention provides a display module, including a display panel, a backlight arranged to be opposite to the display panel and a frame used for connecting the display panel with the backlight, wherein the frame includes a plurality of frame side walls arranged on surroundings of the display panel and the backlight in a surrounding manner, supporting structures used for supporting the display panel are respectively arranged on at least two oppositely arranged frame side walls, the backlight is arranged below the supporting structures, and the frame further includes a fixing structure used for fixing the display panel on the supporting structures.

Preferably, multiple pairs of notches are formed on the at least two oppositely arranged frame side walls, and the supporting structure includes a plurality of supporting elements formed by bending a part of each one of the at least two oppositely arranged frame side walls corresponding to the notch towards the center of the display panel.

Preferably, the supporting structure is of a strip-shaped structure, and the side face of the strip-shaped structure is fixed on each one of the at least two oppositely arranged frame side walls in a welding or integral forming manner.

Preferably, the distance between the supporting surface of the supporting structure and the top end of the corresponding frame side wall is equal to the thickness of the display panel.

Preferably, the fixing structure includes an adhesion element arranged between the display panel and the supporting structure, and/or shielding elements respectively arranged at the top ends of the at least two oppositely arranged frame side walls, and the shielding elements are pressed on a non-display area of the display panel.

Preferably, the frame includes four frame side walls, the supporting structures are respectively arranged on two opposite frame side walls, and the shielding elements are respectively arranged at the top ends of the remaining two opposite frame side walls.

Preferably, the shielding elements and the frame side walls form an integral structure.

Preferably, the backlight includes a backplane and an optical film arranged above the backplane, the backplane includes a backplane bottom wall, a backplane side wall and a loading platform arranged at the top end of the backplane side wall, and the optical film is arranged between the loading platform and the supporting structure.

Preferably, the display module further includes a connecting element used for connecting the frame side wall with the backplane side wall.

Correspondingly, the present invention further provides a display device, which includes the above-mentioned display module.

In the present invention, since the supporting structure can support the display panel and isolate the display panel from the optical film of the backlight, the display module provided by the present invention needs no rubber frame, thereby simplifying the structure of the display module and reducing the cost. Moreover, after the rubber frame is canceled, the display area is increased to better benefit the achievement of a narrow frame design. In addition, the fixing structure can be used for fixing the display panel on the supporting structure, thus even if in a process of moving the display module, the display panel can be stably supported on the supporting structure, and accordingly, the structure stability of the display module is improved.

Figure 1:
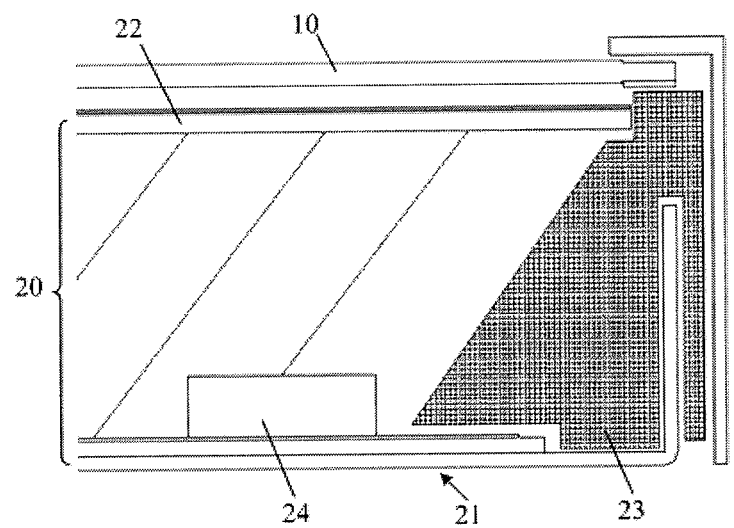
FIG. 1 is a schematic diagram of a local structure of an existing display device.

REFERENCE SIGNS 10. display panel; 20. backlight; 21. backplane; 211. backplane bottom wall; 212. backplane side wall; 213. loading platform; 22. optical film; 23. rubber frame; 24. light emitting component; 30. frame; 31. frame side wall; 32. supporting structure; 321. supporting element; 33. adhesion element; 34. shielding element; 40. connecting element.

DETAILED DESCRIPTION OF THE EMBODIMENTS

In order that those skilled in the art can better understand the technical solution of the present invention, a further detailed description of the present invention will be given below in conjunction with the accompanying drawings and the specific embodiments.

It should be noted that, "upper" and "lower" in the present invention refer to upper and lower directions in FIG. 1 to FIG. 5.

As an aspect of the present invention, a display module is provided, as shown in FIG. 2 to FIG. 5, the display module includes a display panel 10, a backlight 20 arranged to be opposite to the display panel 10 and a frame 30 used for connecting the display panel 10 with the backlight 20, wherein the frame 30 includes a plurality of frame side walls 31 arranged on the surroundings of the display panel 10 and the backlight 20 in a surrounding manner, supporting structures 32 used for supporting the display panel 10 are respectively arranged on at least two oppositely arranged frame side walls 31, the backlight 20 is arranged below the supporting structures 32, and the frame 30 further includes a fixing structure used for fixing the display panel 10 on the supporting structures 32.

It should be noted that, the supporting structure 32 belongs to a part of the frame 30, the supporting structure 32 can support the display panel 10 and isolate the display panel 10 from the an optical film 22 of the backlight 20, thus the display module provided by the present invention needs no rubber frame, thereby simplifying the structure of the display module and reducing the cost. Moreover, after the rubber frame is canceled, the display area is increased to better benefit the achievement of a narrow frame design. In addition, the fixing structure can be used for fixing the display panel 10 on the supporting structure 32, thus even if in a process of moving the display module, the display panel 10 can be stably supported on the supporting structure, and accordingly, the structure stability of the display module is improved.

The supporting structure 32 may be provided with different structural forms, as long as the supporting structure can support the display panel 10 and isolate the display panel 10 from the backlight 20. For example, the supporting structure 32 may be of a strip-shaped structure, and the side face of each strip-shaped structure is fixed on one frame side wall 31 in a welding or integral forming manner.

Figure 4:
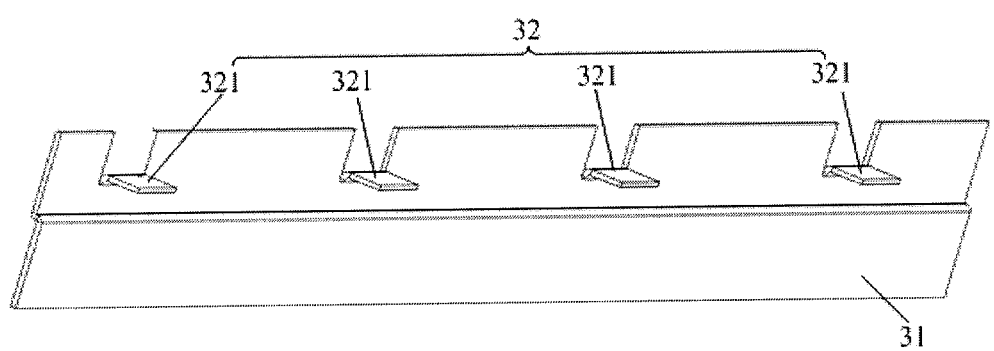
FIG. 4 is a schematic diagram of a structure of a frame side wall provided with a supporting element.

As a specific embodiment of the present invention, multiple pairs of notches are respectively formed on the at least two oppositely arranged frame side walls 31, each pair of notches includes a notch formed on one frame side wall 31 and a notch formed on the other opposite frame side wall 31, and the positions of the two notches are corresponding, as shown in FIG. 4, the supporting structure 32 includes a plurality of supporting elements 321 formed by bending the parts of the frame side walls 31 corresponding to the notches towards the center of the display panel 10. The multiple pairs of notches are uniformly formed on the at least two oppositely arranged frame side walls for uniformly distributing the plurality of supporting elements 321 on the at least two oppositely arranged frame side walls, so as to stably support the display panel 10. This structure has the advantages that the frame side wall 31 itself can support the supporting structure 32, compared with the supporting structure made of other materials on the frame side wall 31, the preparation method of the supporting structure 32 in the embodiment is simpler, and materials are saved.

Figure 2:
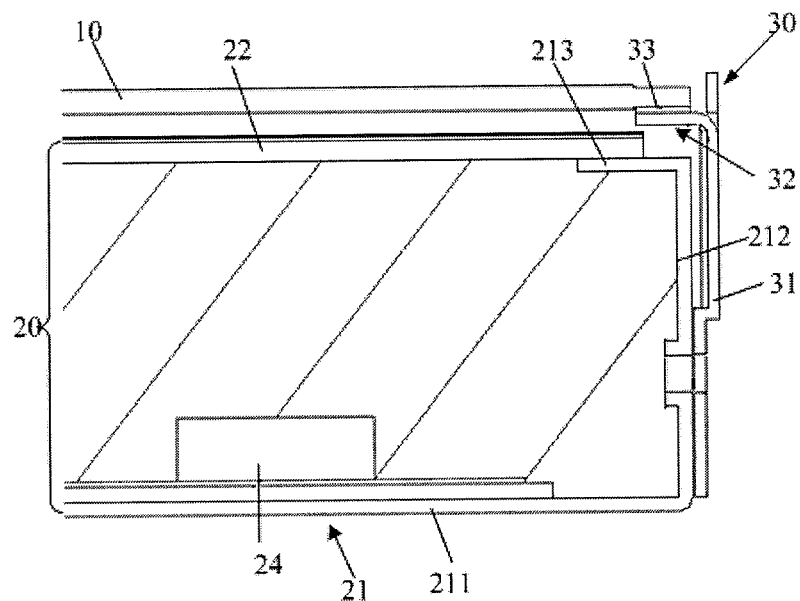
FIG. 2 is a schematic diagram of a local structure of a display module in an embodiment of the present invention.

In the present invention, the plurality of frame side walls 31 are arranged on the surroundings of the display panel 10 and the backlight 20 in the surrounding manner, that is, in the vertical direction in FIG. 2, the position of the supporting structure 32 is lower than the positions of the top ends of the frame side walls 31. Preferably, as shown in FIG. 2, the distance between the supporting surface of the supporting structure 32 and the top end of the corresponding frame side wall 31 is equal to the thickness of the display panel 10, such that in a process of moving the display module, the side face of the display panel 10 is completely shielded and protected by the frame side walls 31, therefore possible damage to the display panel 10 in the process of moving the display module can be reduced. Moreover, the frame side walls 31 do not protrude from the light emission surface of the display panel, so that the display device is more beautiful.

In the present invention, the structural form and the arrangement manner of the fixing structure are not specifically limited, as long as the display panel can be fixed on the supporting structure.

Figure 3:
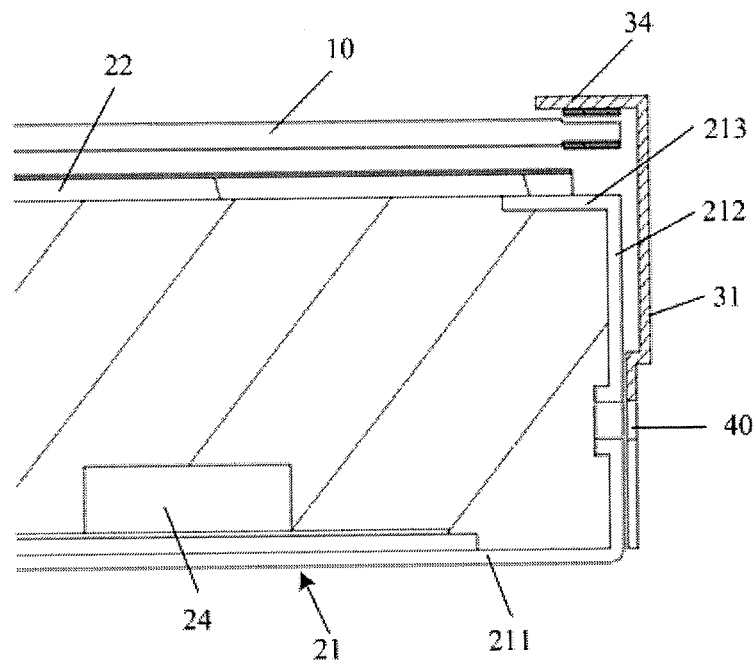
FIG. 3 is a schematic diagram of a local structure of a display module with a shielding element in another embodiment of the present invention.

As a specific embodiment of the present invention, the fixing structure includes an adhesion element 33 (as shown in FIG. 2) arranged between the display panel 10 and the supporting structure 32, and/or, shielding elements 34 respectively arranged at the top ends of the at least two oppositely arranged frame side walls 31, and the shielding elements 34 are pressed on a non-display area of the display panel 10 (as shown in FIG. 3). Namely, the fixing structure includes the following three conditions. The first condition is that, only the adhesion element 33, for example, double faced adhesive tape, adhesive or the like, is arranged between the display panel 10 and the supporting structure 32. The second condition is that, only the shielding elements 34 are respectively arranged at the top ends of the at least two oppositely arranged frame side walls 31 (the supporting structures 32 may be arranged on these frame side walls 31 or the supporting structures 32 are not arranged). The third condition is that, the adhesion element 33 is arranged between the display panel 10 and the supporting structure 32, meanwhile the shielding elements 34 are respectively arranged at the top ends of the at least two oppositely arranged frame side walls 31 (the supporting structures 32 may be arranged on these frame side walls 31 or the supporting structures 32 are not arranged). The adhesion element 33 may fixedly connect the display panel 10 with the supporting structure 32, the shielding elements 34 are pressed on the non-display area of the display panel 10 to prevent the display panel 10 from moving up and down, so as to fix the display panel 10 in a space limited by the shielding elements, the supporting structures and the frame side walls (under the condition that the fixing structure includes the shielding elements 34) to stably fix the display panel 10. The adhesion element 33 is made of a material with adhesiveness.

Preferably, the fixing structure includes the adhesion element 33 arranged between the display panel 10 and the supporting structure 32 and the shielding elements 34 respectively arranged at the top ends of the at least two oppositely arranged frame side walls 31. In this case, even if in a process of carrying a display module with a large size and a large weight, the structure stability of the display panel can still be improved by the dual fixing function of the adhesion element 33 and the shielding elements 34.

When the fixing structure includes the shielding elements 34, the numbers of the supporting structures 32 and the shielding elements 34 are not limited, for example, the supporting structures 32 may be arranged on two oppositely arranged frame side walls 31, and the supporting structures 32 may also be arranged on three or four frame side walls 31, similarly, the shielding elements 34 may be arranged at the top ends of two oppositely arranged frame side walls 31, and the shielding elements 34 may also be arranged at the top ends of three or four frame side walls.

As a specific embodiment of the present invention, the frame 30 includes four frame side walls 31, the supporting structures 32 are arranged on two oppositely arranged frame side walls, and the shielding elements 34 are respectively arranged at the top ends of the remaining two oppositely arranged frame side walls 31.

Preferably, the shielding elements 34 and the frame side walls 31 form an integral structure, such that the connection of the shielding elements 34 and the frame side walls 31 is more stable, specifically, the top ends of metal plates used for preparing the frame side walls can be bent towards the center of the display panel 10 to form the frame side walls 31 and the shielding elements 34.

Figure 5:
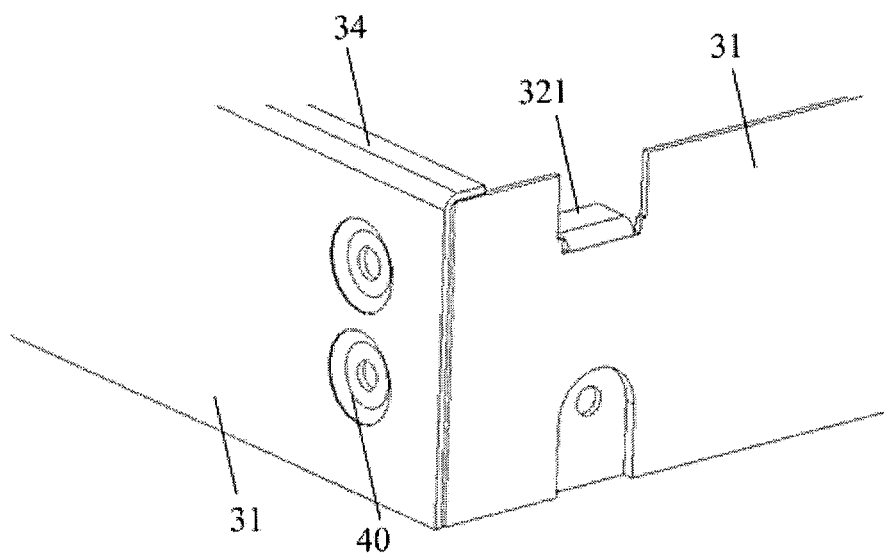
FIG. 5 is a schematic diagram of local structures of two adjacent frame side walls.

As shown in FIG. 5, the shielding element 34 may be arranged at the top end of one frame side wall 31 in two adjacent frame side walls, the supporting structure is arranged on the other frame side wall 31, the upper surface of the display panel 10 supported on the supporting structure 32 is flush with the top ends of all the frame side walls, the shielding element 34 arranged at the top end of the one frame side wall is pressed on the display panel and may also be simultaneously pressed on the top end of the other frame side wall, in order to improve the assembly stability of the frame 30.

As shown in FIG. 2, the backlight 20 includes a backplane 21 and an optical film 22 arranged above the backplane 21, the backplane 21 includes a backplane bottom wall 211, a backplane side wall 212 and a loading platform 213 arranged at the top end of the backplane side wall 212, and the optical film 22 is arranged between the loading platform 213 and the supporting structure 32, so that the optical film 22 is fixed between the loading platform 213 and the supporting structure 32. Of course, a light emitting component 24 for providing a light source is further arranged on the backplane bottom wall 211.

As shown in FIG. 3 and FIG. 5, the display module may further include a connecting element 40 used for connecting the frame side wall 31 with the backplane side wall 212, and the connecting element 40 may be a detachable structure such as a screw or the like.

As another aspect of the present invention, a display device is provided, including the above-mentioned display module provided by the present invention. Of course, the display device may further include other known structures, such as a power supply unit, a driving control unit and the like, and descriptions of the known structures are omitted herein.

The display device in the present invention may be a liquid crystal display device. In addition, the display device may also be any other product or component with a display function, such as electronic paper, a mobile phone, a tablet computer, a television set, a display, a notebook computer, a digital photo frame, a navigator or the like. The above-mentioned display module without rubber frame can stably support the display panel and can isolate the display panel from the optical film of the backlight, thereby not only reducing the cost of the display device, but also increasing the display area of the display device to benefit the achievement of a narrow frame design.

It should be understood that, the above embodiments are merely exemplary embodiments adopted for describing the principle of the present invention, rather than limiting the present invention. Various variations and improvements may be made by those of ordinary skill in the art without departing from the spirit and essence of the present invention, and these variations and improvements are encompassed within the protection scope of the present invention.

The invention claimed is:

1. A display module, comprising a display panel, a backlight arranged to be opposite to the display panel and a frame used for connecting the display panel with the backlight, wherein the frame comprises a plurality of frame side walls arranged on surroundings of the display panel and the backlight in a surrounding manner, supporting structures used for supporting the display panel are respectively arranged on at least two oppositely arranged frame side walls, the backlight is arranged below the supporting structures, and the frame further comprises a fixing structure used for fixing the display panel on the supporting structures, wherein multiple pairs of notches are formed on the at least two oppositely arranged frame side walls, and the supporting structure comprises a plurality of supporting elements formed by bending a part of each one of the at least two oppositely arranged frame side walls corresponding to the notch towards a center of the display panel.

2. The display module of claim 1, wherein the supporting structure is of a strip-shaped structure, and a side face of the strip-shaped structure is fixed on each one of the at least two oppositely arranged frame side walls in a welding or integral forming manner.

3. The display module of claim 1, wherein a distance between a supporting surface of the supporting structure and a top end of the corresponding frame side wall is equal to a thickness of the display panel.

4. The display module of claim 1, wherein the fixing structure comprises an adhesion element arranged between the display panel and the supporting structure, and/or,
shielding elements respectively arranged at top ends of the at least two oppositely arranged frame side walls, and the shielding elements are pressed on a non-display area of the display panel.

5. The display module of claim 2, wherein the fixing structure comprises an adhesion element arranged between the display panel and the supporting structure, and/or,
shielding elements respectively arranged at top ends of the at least two oppositely arranged frame side walls, and the shielding elements are pressed on a non-display area of the display panel.

6. The display module of claim 3, wherein the fixing structure comprises an adhesion element arranged between the display panel and the supporting structure, and/or,
shielding elements respectively arranged at top ends of the at least two oppositely arranged frame side walls, and the shielding elements are pressed on a non-display area of the display panel.

7. The display module of claim 4, wherein the frame comprises four frame side walls, the supporting structures are respectively arranged on two opposite frame side walls, and the shielding elements are respectively arranged at top ends of the remaining two opposite frame side walls.

8. The display module of claim 4, wherein the shielding elements and the frame side walls form an integral structure.

9. The display module of claim 1, wherein the backlight comprises a backplane and an optical film arranged above the backplane, the backplane comprises a backplane bottom wall, a backplane side wall and a loading platform arranged at a top end of the backplane side wall, and the optical film is arranged between the loading platform and the supporting structure.

10. The display module of claim 2, wherein the backlight comprises a backplane and an optical film arranged above the backplane, the backplane comprises a backplane bottom wall, a backplane side wall and a loading platform arranged at a top end of the backplane side wall, and the optical film is arranged between the loading platform and the supporting structure.

11. The display module of claim 3, wherein the backlight comprises a backplane and an optical film arranged above the backplane, the backplane comprises a backplane bottom wall, a backplane side wall and a loading platform arranged at a top end of the backplane side wall, and the optical film is arranged between the loading platform and the supporting structure.

12. The display module of claim 9, further comprises a connecting element used for connecting the frame side wall with the backplane side wall.

13. A display device, comprising the display module of claim 1.

* * * * *